May 12, 1959
J. D. McMICHAEL
2,886,130
CLEANER SILENCER ASSEMBLY
Filed Oct. 10, 1956
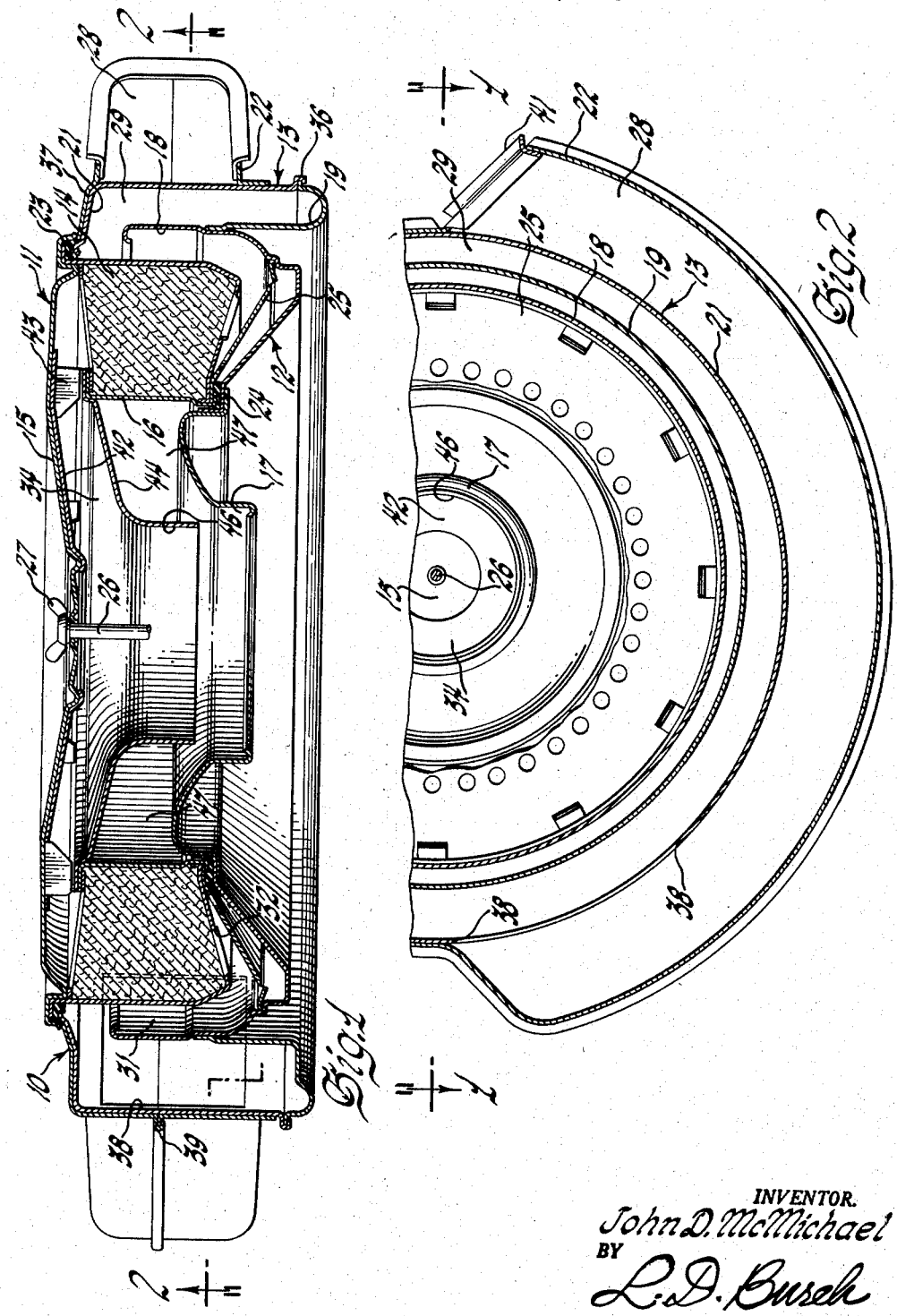
INVENTOR.
John D. McMichael
BY
L. D. Busch
ATTORNEY United States Patent Office 2,886,130
Patented May 12, 1959

2,886,130

CLEANER SILENCER ASSEMBLY

John D. McMichael, Swartz Creek, Mich., assignor to General Motors Corporation, Detroit, Mich., a corporation of Delaware Application October 10, 1956, Serial No. 615,146

1 Claim. (Cl. 183—44)

This invention relates to cleaner silencer assemblies especially applicable for V-type automotive engines and has particular relation to means for constructing such assemblies whereby they will be suitable for high production at low cost.

In the drawing:

Figure 1 is a vertical sectional view of a cleaner silencer assembly embodying the principles of the invention. Figure 1 is taken diametrically across the assembly, substantially in the plane of 1—1 of Figure 2.

Figure 2 is a fragmentary cross sectional view of the assembly shown by Figure 1, taken substantially in the plane of line 2—2 of Figure 1.

The cleaner silencer assembly 10 embodying the invention embodies a plurality of subassembly units indicated at 11, 12 and 13. The unit 11 is essentially a filter unit for the structure and includes a cover 15 and a filter 14 contained within the wall means forming a filter casing 16 and an oil control baffle 25 secured to the lower part of the casing 16. The filter unit 11 is adapted to be removably mounted in a supporting unit 12 which is formed by wall means of suitable configuration to provide an outlet 17, a filter chamber casing 18 having an annular skirt 19 extending downwardly and outwardly from an outer side wall thereof. The unit 13 comprises wall means forming an inlet chamber casing 21 and an inlet passage casing 22. The unit 11 is removably secured in unit 12 on gasket means indicated at 23 and 24. A bolt 26 and wing nut 27 may be employed for removably securing the unit 11 in position and for securing the assembly 10 to the induction system of the engine with which the assembly may be employed. Air is admitted to the engine through an inlet passage 28 leading to an inlet chamber 29 which surrounds an annular inlet 31 leading to the lower part of the filter casing 16 having openings 32 in a lower wall thereof by which the air is admitted to the filter 14. The filter unit cover 15 extends entirely across the unit above the filter casing 16 and cooperates with the inner wall of the filter casing 16 and the outlet 17 to form a discharge chamber 34 from which the air from the filter 14 is supplied to the engine. Sound waves from the engine received through the outlet 17 are attenuated by the capacitance of the discharge chamber 34, by the impedance of the filter 14 and annular inlet 31, by the capacitance of the inlet chamber 29 and by the impedance of the inlet passage 28.

While the units 12 and 13 may be manufactured separately they are adapted to be permanently assembled by crimping the edges of the parts 21 and 19 to provide a bead indicated at 36. The inlet passage 28 is formed around the casing 21 by wall means forming a continuous band 37 having the opposite edges thereof secured to the casing 21 and being expanded between the edges thereof to provide the passage 28. In the present instance the passage extends from the front to the rear of the structure and communicates through an opening 38 with the inlet chamber 29 at one side of but immediately adjacent the widest part of the chamber 29. It will be apparent that air admitted through the passage 28 will have a tendency to continue to move within the chamber 29 until it reaches the narrowest part of the chamber at the opposite side of the chamber. Thereafter the air will tend to be distributed uniformly around the casing for uniformly supplying air to the annular air inlet 31. The wall means or band 37 may be formed in two parts or sections with the flanged adjacent edges thereof crimped to provide a bead indicated at 39. The opening at the outer end of the passage may be made to operate more quietly by having a flanged ring 41 secured therein. The cover 15 being somewhat flexible, may be reinforced by an inner plate 42 from which supports 43 may be struck out and bent laterally to space the cover properly from the casing 16. In order to improve the acoustical capacity of the structure for attenuating certain high pitch sounds it is proposed to provide a baffle 44 in the discharge chamber 34. The baffle may be secured to the upper edge of the inner wall of the casing 16 and may have outlet passage 46 formed centrally thereof and extending toward the outlet 17. However, the end of the outlet passage 46 should be spaced from the outlet 17 to provide an acoustical coupling with the expansion chamber 47 formed within the baffle 44, the inner wall of the casing 16 and the part of the casing 18 adjacent the outlet 17. It will be apparent that the baffle 44 will form a part of the unit 11 and will be removable from the discharge chamber 34 with the unit 11. This will render the entire inner surface of the casing 16 exposed so that the surface may be properly cleaned.

I claim:

A cleaner silencer assembly comprising a pair of concentric walls disposed one within the other, said one wall being formed to provide an annular inlet chamber and an annular filter chamber, said other wall being formed to provide an annular inlet between said inlet chamber and said filter chamber, said other wall being spaced circumferentially outwardly of said one wall between the edges of said other wall to provide an arcuate passage, said arcuate passage at one end being open to the atmosphere through said other wall and at the other end to said inlet chamber through said one wall, said one wall and said other wall being flanged inwardly and secured together at corresponding edges to provide an opening leading to said filter chamber, filter means disposed in said filter chamber through said opening, a removable cover enclosing said filter means and closing said opening and engaging said edges, and an outlet from said filter chamber and leading away from said filter through the central part of said one wall and being adapted to be connected to the induction system of an internal combustion engine.

References Cited in the file of this patent

UNITED STATES PATENTS

| 1,899,911 | Kamrath | Feb. 28, 1933 |
| 2,652,901 | Moler | Sept. 22, 1953 |
| 2,764,142 | McMullen | Sept. 25, 1956 |

FOREIGN PATENTS

| 967,545 | France | Mar. 29, 1950 |
| 854,129 | Germany | Oct. 30, 1952 |
| 869,710 | Germany | Mar. 5, 1953 |
| 937,131 | Germany | Dec. 29, 1955 |
| 725,363 | Great Britain | Mar. 2, 1955 |